United States Patent [19]
Lachaise

[11] 3,731,011
[45] May 1, 1973

[54] SYSTEM FOR MEASURING THE REGENERATION THRESHOLD OF REPEATERS FOR MULTIPLEX PULSE CODE MODULATION AND DATA TRANSMISSION SYSTEMS

[76] Inventor: Jean M. Lachaise, 28 rue des Freres Lumiere, Fresnes, France

[22] Filed: Nov. 22, 1971

[21] Appl. No.: 200,805

[30] Foreign Application Priority Data

Dec. 3, 1970 France ................................7043522

[52] U.S. Cl. ........................................179/175.31 R
[51] Int. Cl. ..............................................H04b 3/46
[58] Field of Search ............................179/175.31 R; 328/104, 162, 164, 14; 340/146.1 E, 352, 355

[56] References Cited

UNITED STATES PATENTS 3,083,270 3/1963 Mayo..........................179/175.31 R
3,062,927 11/1962 Hamori.......................179/175.31 R
3,678,222 7/1972 Boehly.........................179/175.31 R
3,649,777 3/1972 Matsushima................179/175.31 R

*Primary Examiner*—Kathleen H. Claffy
*Assistant Examiner*—Douglas W. Olms
*Attorney*—Abraham A. Saffitz

[57] ABSTRACT

A system for supervising the operation of a repeater for pseudo-ternary coded signals, comprising means for applying a random sequence of message signals transmitted in pseudo-ternary code to the repeater input via an artificial line whose characteristics simulate the characteristics of a real line; means for periodically injecting into such sequence measuring signals having at least one of a number of predetermined compositions; means for adjusting the amplitude relationship of a single pulse chosen in each of the measuring signals to the peak amplitude of all the transmitted signals; and counting means for measuring at the repeater output the number of polarity errors occurring in a predetermined period of time.

5 Claims, 6 Drawing Figures

Patented May 1, 1973 3,731,011

6 Sheets-Sheet 2

Figure 1:
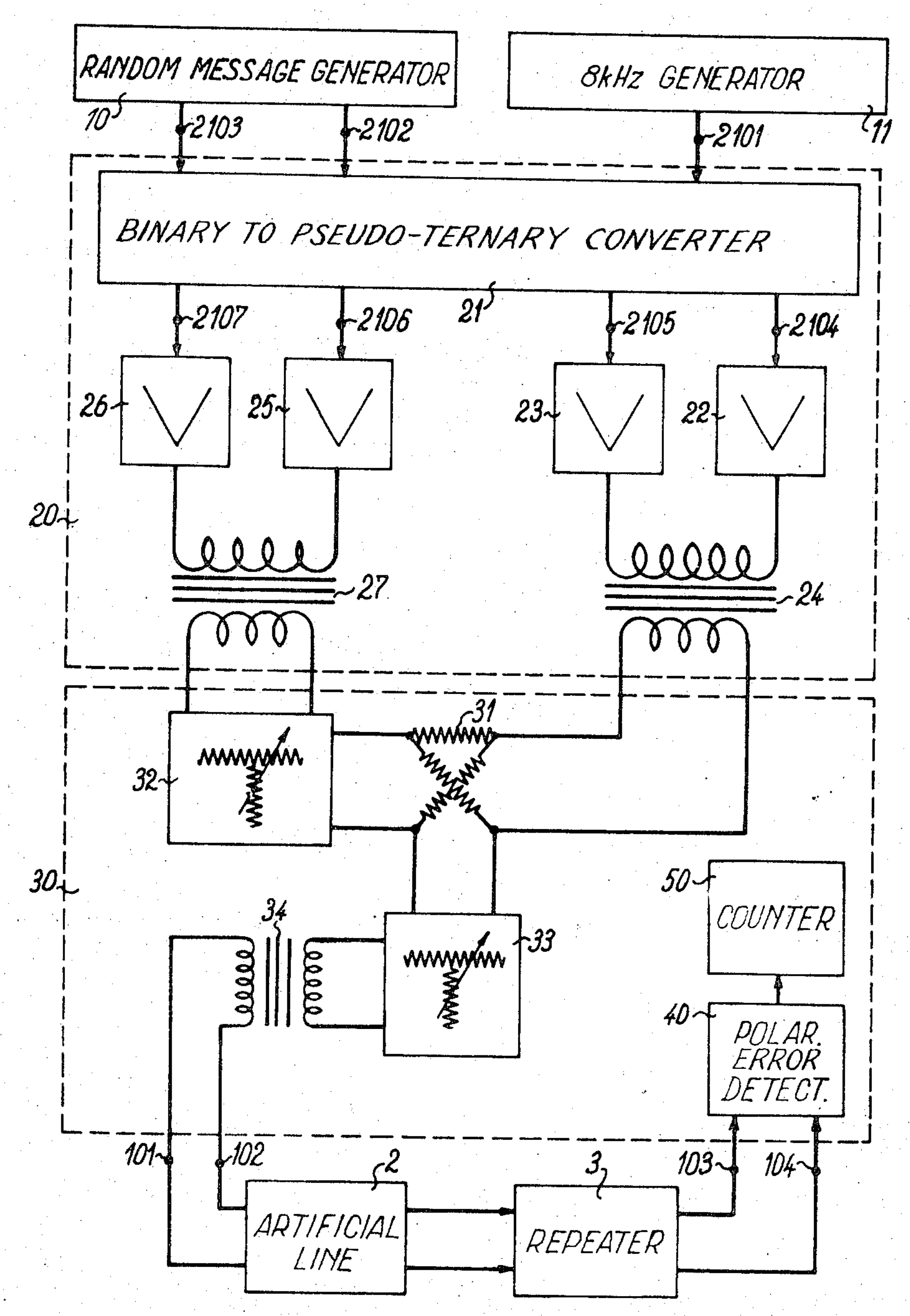

SYSTEM FOR MEASURING THE REGENERATION THRESHOLD OF REPEATERS FOR MULTIPLEX PULSE CODE MODULATION AND DATA TRANSMISSION SYSTEMS

This invention relates to a novel process and system for measuring and supervising the operation of pulse code modulation (PCM) repeaters, more particularly for the pulse code modulation (PCM) transmission of multiplex telephone signals or for data transmission signals. The invention is of use more particularly for rapid works checking of repeater performances, which may vary in series production of such repeaters.

The invention relates more particularly, amongst such systems, to repeaters for high-speed signals transmitted in a bipolar code, generally called "pseudoternary code." To give some idea, transmission speed, hereinafter given the reference R, may be at the standard rate of 2048 kilobits/seconds, in which event the total length of duration T allotted to each elementary signal is less than 0.5 microsecond.

Of course, in transmission systems in which information sources deliver binary-code signals — i.e., signals each of which can have one or the other of two values A and Z, such values often being represented by, for instance, electric voltages of 0 volt and 1 volt, respectively, the D.C. (direct-current) component of the transmitted currents is generally suppressed to facilitate line or cable or some other form of transmission. For DC suppression, the binary-code signals are converted into pseudo-ternary-code signals before line transmission. For this conversion, three values, which can be called $B_1$, O and $B_2$, $B_2$ being merely the value $B_1$ with a different algebraic sign, are made to correspond to the values A and Z. The three values can be represented e.g., by voltage of +1 volt, 0 volt and −1 volt, each of the voltages +1 volt and −1 volt existing only for a period T/2 corresponding to half the length or duration allotted to each signal $B_1$ or $B_2$. This assumption will be made hereinafter, $B_1$ and $B_2$ being replaced by +1 and −1 although they each have such a value for only half their length T.

The binary-to-pseudo-ternary conversion is therefore based on the following rules :

1. a signal $A = 0$ is converted into a zero signal.
2. a signal $Z = 1$ is converted into a +1 signal or into a −1 signal according to the condition of the immediately previous non-zero signal, so that there can never be two consecutive (+1) signals nor two consecutive (−1) signals, whether or not separated by one or more zero signals.
3. To facilitate conversion, it will be assumed that the binary signals A and Z each occupy only some — e.g., 50 percent — of the time interval T allotted to each of them, the remainder of the time T being occupied by a zero signal. Consequently, two signals (+1) and (−1) are always separated by a time interval occupied by a zero signal as a result of the conversion rule specified in (2) in the foregoing. When the condition of (+1) signals alternating with (−1) signals ceases either as a result of deliberate action or as a result of transmission faults, there is said that a "polarity error exists".

When received after transmission over a length of line, both the wave form and the starting and finishing times of the initially rectangular wave-form bipolar signals have undergone considerable distortion. To obviate this disadvantage, signals which have travelled over a given length of line are supplied to a repeater in which, in each one of a series of time intervals each of duration T, the received signal is checked for its state (+1, 0 or −1), the repeater outputting a signal having the required wave form and timing.

Repeaters of this kind are described, for instance, in an article by J.S. Mayo, published in the American periodical "Bell System Technical Jounal," Vol 41, January 1962, page 25 to 98, and FIG. 1 on page 29 of the article discloses their structure in diagrammatic form. A similar description can also be found in an article by J. Baudin and P. Desombre, which was published in the French periodical "Cables & Transmission," 24th year, January 1970, pages 33–42, and FIG. 9 on page 35 of the latter article gives a corresponding basic diagram.

All that will be recalled here is that a repeater mainly comprises :

an amplifier having a negative-feedback network providing approximate compensation, at least over a limited frequency range, of line distortion;

a peak detector circuit delivering a reference voltage proportional to the peak amplitude of the signals received at the amplifier output;

two transmission channels, one for positive signals and the other for negative signals;

a rectifier of the signals of both polarities, the rectifier synchronizing a generator producing very short pulses having the same repetition rate as the transmission speed R, such pulses serving as test pulses — i.e., as sampling pulses for two decision circuits which decide in both transmission channels whether the intantaneous value of the signal present is above or below a decision-point taken as a percentage, e.g., 50 percent, of the reference voltage just mentioned, and two restoring circuits which, according to the result provided by each decision circuit, do or do not output a restored pulse of corresponding polarity, and an adding circuit coupling the restoring circuits to the repeater output.

One known way of checking whether a repeater is operating satisfactorily is to apply three measuring signals consecutively to the repeater input, each measuring signal having the length 3 T, the composition of each such signal in pseudo-ternary code possibly being represented by (−1, +1, −1), (1, 0, 0) and (0, 0, 1) respectively. The wave shapes produced for each of these three kinds of signal at the amplifier output are observed on an oscilloscope. If the corresponding curves are superimposed, a figure called a "eye diagram" is obtained which should normally have a clear central portion whose size is a measure of repeater equalization quality. Detailed descriptions on this point are given in the already cited J.S. Mayo's article, inter alia on pages 32 to 34.

This invention relates to an improved process and system by which a direct numerical estimation of repeater performance quality can be obtained from measurement signals in dependence upon the relationship of the adjustable level of a measuring pulse included in each measuring signal, in conditions simulating the practical operation of the repeater.

This invention provides a system for supervising the operation of a repeater for pseudo-ternary coded signals, comprising means for applying a random sequence of message signals transmitted in pseudo-ternary code to the repeater input via an artificial line whose characteristics simulate the characteristics of a real line, means for periodically injecting into such sequence measuring signals having at least one of a number of predetermined compositions, means for adjusting the amplitude relationship of a single pulse chosen in each of the measuring signals to the peak amplitude of all the transmitted signals, and means for measuring at the repeater output the number of polarity errors occurring in a predetermined period of time.

Preferably, the binary-code measuring signals have three different possible compositions respectively represented in binary code by (1, 1, 1), (01) and (1), and the latter measuring signals are transposed into pseudo-ternary code without polarity violation in relation to the immediately preceding random message pseudo-ternary signal in the case of the binary signal (111) and with systematic polarity errors in relation to the immediately previous random pseudo-ternary signal in the case of the binary signals (0, 1) and (1).

Preferably too, the random signals are produced in binary code and then converted into pseudo-ternary code by conversion means which perform the same conversion on the measuring signals.

Figure 2A:
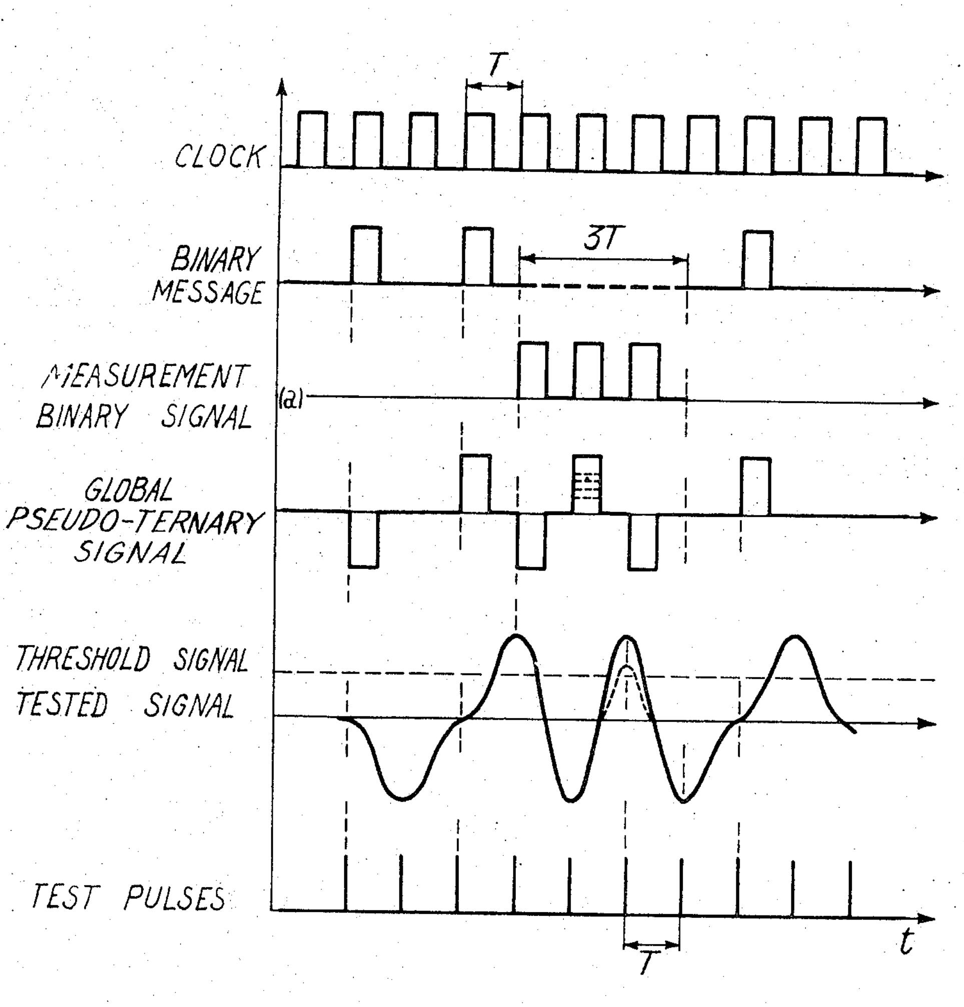
Figure 2B:
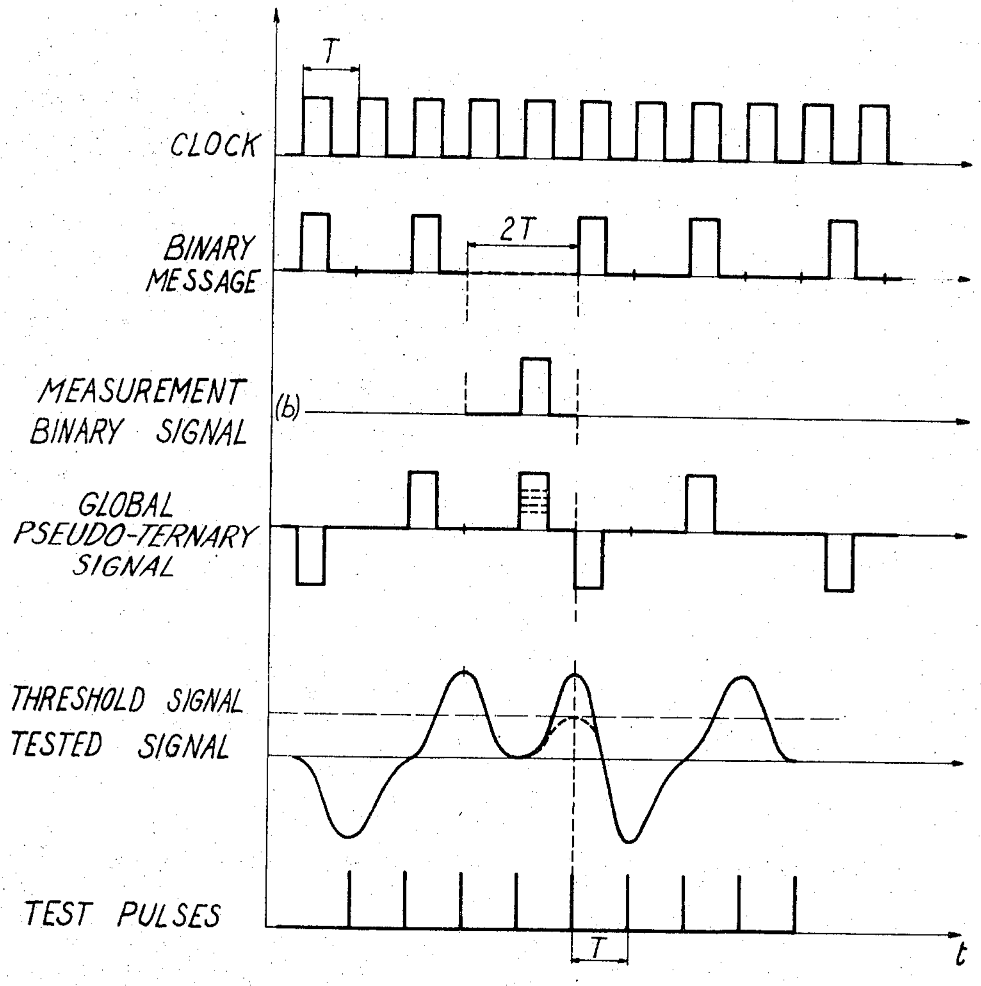
Figure 2C:
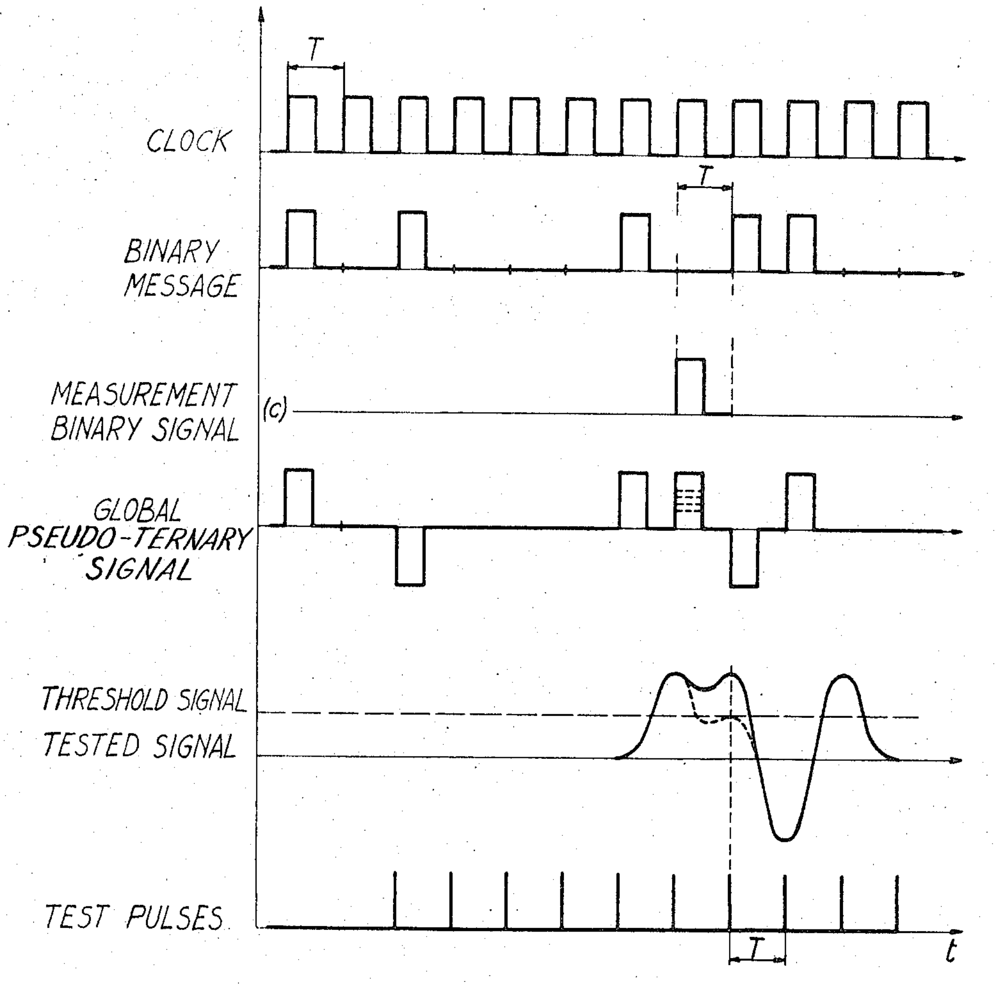

The characteristics and advantages of the invention will be more clearly understood from the following detailed description and with the help of the accompanying drawings wherein :

FIG. 1 is a block schematic view of the system according to the invention;

FIGS. 2*a*, 2*b* and 2*c* are graphs showing the wave forms of the various measuring signals used in the operation of the system according to the invention, for the three lines of measuring signals hereinbefore mentioned, which will hereinafter be referred to by the letters *a*, *b* and *c;*

Figure 3:
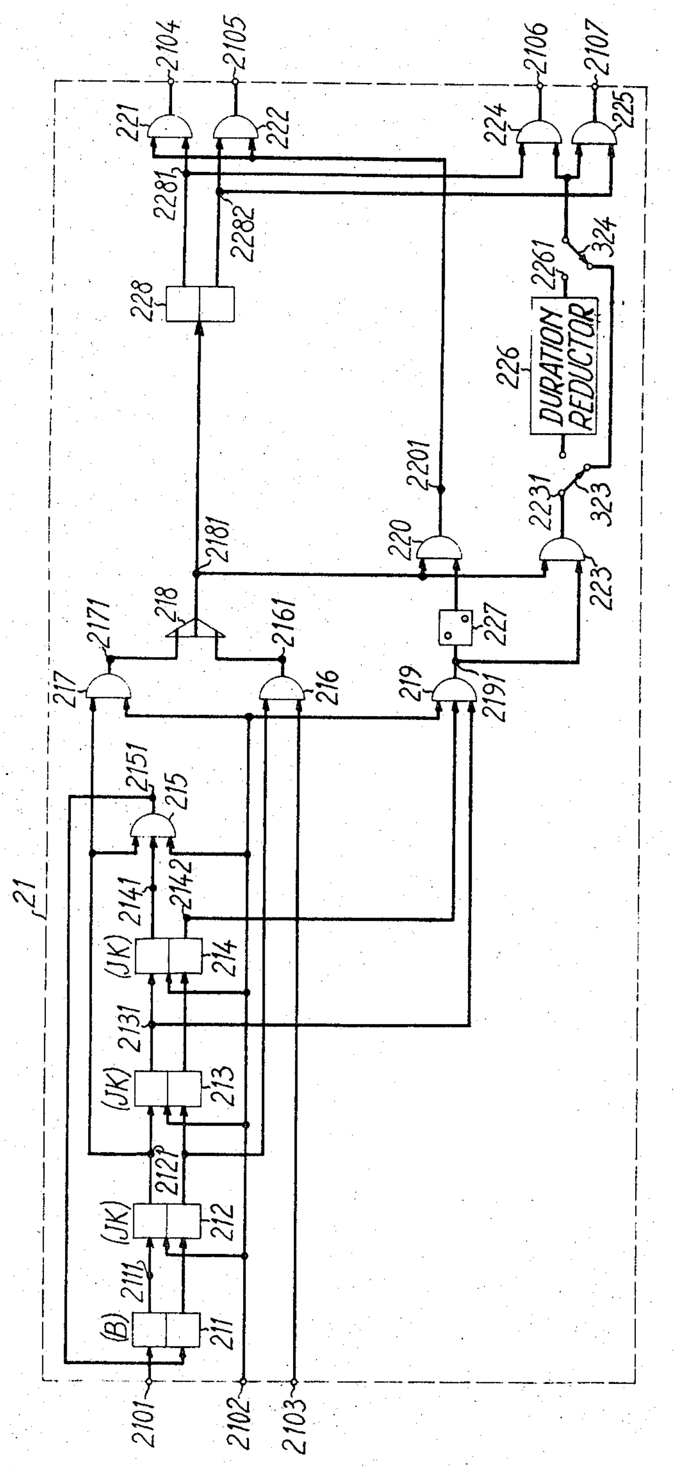
Figure 4:
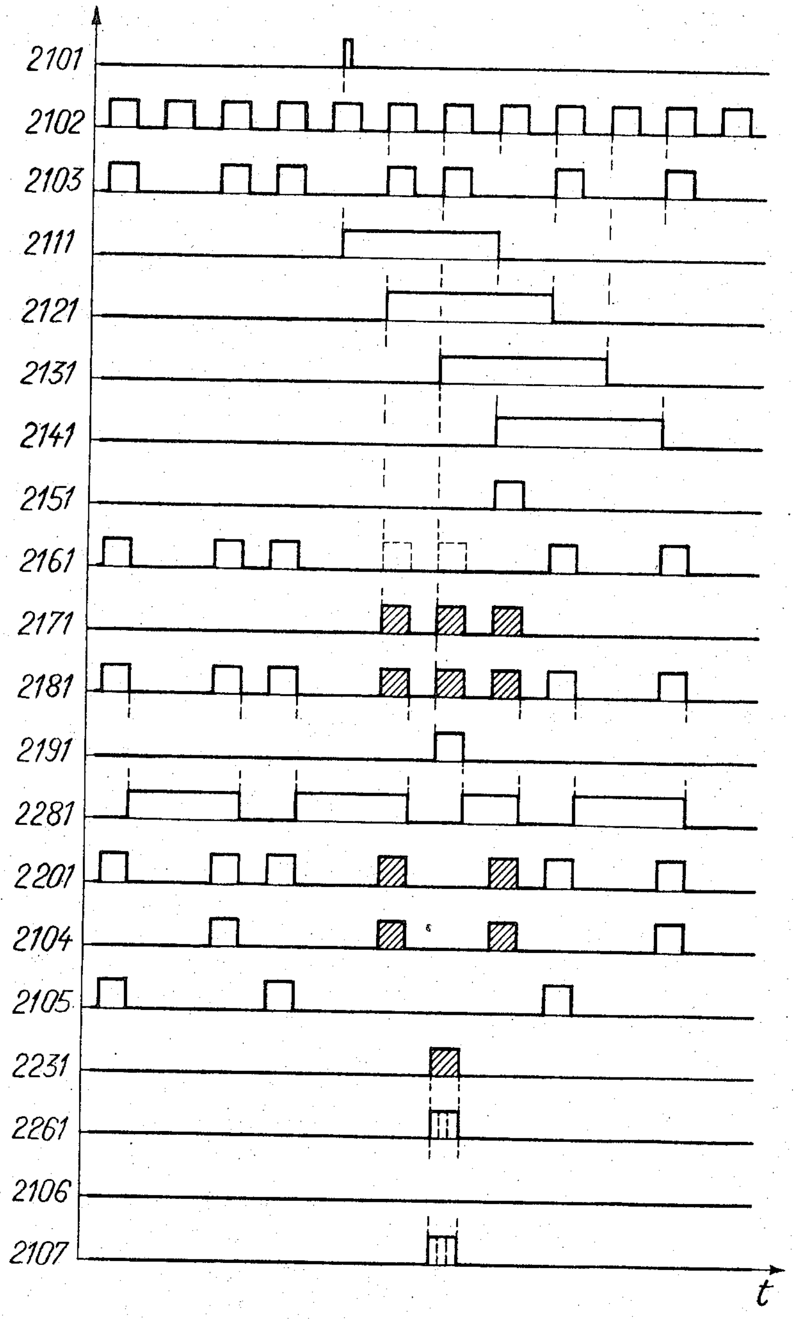

FIG. 3 is a block schematic diagram of that part of the system of FIG. 1 which is used to convert the binary-code signals into pseudo-ternary-code signals, more particularly as regards production of the type *a* measuring signal, and FIG. 4 comprises a number of graphs showing the wave shapes of the signals at various parts of FIG. 3.

Referring first to FIG. 1, a device 10 produces random binary information signals at a transmission speed R of e.g., 2048 kilobits/second; the device 10 outputs these signals continuously at its output terminal 2103 which is also an input terminal of a device 21 whose function will be described hereinafter. Device 10 also comprises a clock pulse generator outputting pulses which have a repetition rate of value R and which are applied to output terminal 2102; like terminal 2103, terminal 2102 is also an input terminal of device 21. A generator 11 outputs brief periodic pulses at a repetition rate of e.g., 8 kHz at terminal 2101 which is also an input terminal of device 21.

Device 21, which, together with amplifiers 22, 23, 25, 26 and transformers 24, 27, forms the system 20 of FIG. 1, is a binary-to-pseudo-ternary code translator which translates signals input at terminal 2103 and which delivers the translated signals, according to their polarity, at terminal 2104 or 2105; also, due to the combined action of devices 10 and 11 the translator delivers at terminals 2106 and 2107 measuring signals which have been translated into pseudo-ternary code with or without arbitrary error of polarity relatively to the immediately previous pseudo-ternary information signals according as, in the manner hereinbefore described, the signals concerned are type *a* or type *b* or type *c* measuring signals. Non-zero signals received at terminals 2104, 2105 and amplified by amplifiers 22, 23 will hereinafter always be considered as being of positive polarity, their own polarities being restored at the output of transformer 24 by appropriate choice of the direction of the output connections of amplifiers 22 and 23 to the primary winding of transformer 24. Similar considerations apply to the random signals received at terminals 2106 and 2107 and amplified by amplifiers 25 and 26, then recombined so as to have the correct polarities at the output of transformer 27, whose primary winding is coupled the appropriate way round with the outputs of amplifiers 25 and 26.

Whereas the random signals delivered by transformer 24 are applied directly to the resistance-bridge coupler 31 (except at times when measuring signals replace them because of the effect of pulses output by generator 11), the measuring signals output by transformer 27 after amplification in amplifier 25 or 26 (according to their polarity) have been so processed in translator 21 as now to comprise only a single pulse of length T hereinafter called the "measuring pulse;" the various measuring signals hereinbefore called *a*, *b* and *c* differ from one another after processing in translator 21 as a result of the condition of the pseudo-ternary signals preceding the measuring pulse.

The measuring pulse is applied to coupler 31 via an adjustable attenuator 32 so that the ratio of measuring-pulse amplitude can be adjusted relatively to the amplitude of the random signals output by transformer 24. The output of coupler 31 feeds the input of a main adjustable attenuator 33 delivering to the primary winding of a transformer 34 whose secondary winding drives input terminals 101, 102 of measuring system 30 comprising, in addition to the elements 31–34, elements 40, 50 which are connected to input terminals 103, 104 of system 30 and whose purpose and nature will be described hereinafter.

Terminals 101, 102 are connected to the input of an artificial line 2 whose electrical characteristics simulate those of the transmission line length at whose end it is required to connect repeater 3. The output thereof is connected to input terminals 103, 104 which also form the input of a polarity error detector 40 which can be of any known kind, for instance, of the kind disclosed by FIG. 42 and pages 77 and 78 of J.S. Mayo's article.

The number of polarity errors found per unit of time (also called "error rate") is measured by a counter 50.

Referring now to FIGS. 2*a*, 2*b* and 2*c*, each is a representation in graph form of time *t* plotted against the wave form at various places in FIG. 1 of the corresponding type *a* or *b* or *c* measuring signals. For instance, FIG. 2*a* shows clock pulses of period T, then the wave form of the random binary message produced by the generator 10; thanks to generator 11, an interval 3 T has been isolated in the binary message to allow the injection of the binary measuring signal (1, 1, 1) shown on the third line of FIG. 2*a*. The wave form of the same signal after its translation into pseudo-ternary form is shown on the fourth line of FIG. 2*a*. As the drawings show, the measuring signal of duration 3 T now comprises a central variable-amplitude measuring pulse, shown here as being of positive polarity, flanked by two fixed-amplitude negative pulses. There is therefore no polarity error in the case of measuring signal *a*.

The fifth line of FIG. 2*a* shows the wave form of the signal of the fourth line after such signal has travelled over the artificial line 2 and been amplified in repeater 3 (FIG. 1). The adjustable measuring pulse of the fourth line has in shape become generally rounded and has become delayed (in the drawings the delay has a value near T, but this relationship is not essential).

Using conventional known means, very brief test pulses which are shown on the sixth line of FIG. 2*a* and which have the period T are produced in repeater 3 from all the signals received at the repeater input. The test pulses are applied in repeater 3 to the pseudo-ternary signal of the fifth line of FIG. 2*a*, such signal containing the adjustable-amplitude measuring pulse, for amplitude sampling of all the pulses of the pseudo-ternary signals, including the variable amplitude of the measuring pulse, at the instant of time when a test pulse appears. At a measuring pulse amplitude (such amplitude can be adjusted by means of attenuator 32 in FIG. 1) below a critical level called the "regeneration threshold level" of the repeater, the same ceases to output a restored pulse, the detector 40 noting a polarity error which the counter 50 counts. On the other hand, if measuring-pulse amplitude is adjusted to a high enough value by means of attenuator 32, a corresponding restored pulse appears at the output of repeater 3 and detector 40 does not note any polarity error.

An analysis of the number of polarity errors found in dependence upon measuring-pulse amplitude defined by means of attenuator 32 provides a measure of the "-goodness" of operation of repeater 3. For instance, operation can be considered satisfactory if errors cease when the threshold level exceeds 50 percent of the maximum level to which the attenuator 32 can be adjusted.

Referring now to FIGS. 2*b* and 2*c*, the six lines of each of them show the corresponding wave forms in the case of the binary measuring signals (01) and (1), as hereinbefore described. In contrast to FIG. 2*a*, in the case shown in FIGS. 2*b* and 2*c* polarity errors must be systematically detected whenever the measuring pulse is adjusted by means of attenuator 32 (FIG. 1) to an amplitude exceeding the threshold level. This is the result of the choice made in translator 21 of the polarity relationship existing between the measuring signal appearing at terminal 2106 or 2107 (the wave form of which signal is shown on the third line of FIGS. 2*b* and 2*c*) and the immediately previous random signal (appearing at terminal 2104 or 2105 in FIG. 1), the wave form of the complete pseudo-ternary signal being shown on the fourth line of FIGS. 2*b* and 2*c*.

As in the case of the type *a* measuring signal, analysis of the number of polarity errors in dependence upon the setting of the attenuator 32 gives a measure of the "goodness" of repeater 3, but in this case with the proviso that operation is better in proportion as more polarity errors are detected.

Referring now to FIG. 3, a description will be given of an embodiment of the facility 20 of FIG. 1 for forming measuring signals of the kind shown in FIG. 2*a*, such signals being introduced into the random message signals every 125 microseconds, i.e., at a frequency of 8 kHz. Such measuring signals are formed by means of logic circuits in translator 21. The system is shown in FIG. 3 and comprises a cyclically operating register having bistables and appropriately energizing sets of and-gates and or-gates which open and close at appropriate times. Operation of facility 21 can be summarized as follows:

with effect from the time determined by the brief 8 kHz pulse output by generator 11 and applied to terminal 2101, bistable (B) 211 changes state and produces, at the first positive transition of the next pulse (applied to terminal 2102), the starting of the shift register formed by the three JK bistables 212–214. When the signal at output 1 of bistable 212 reaches a length equal to three clock periods T, bistable 211 is returned to normal by the output signal at 2151 from and-gate 215. The output pulses of bistables 212–214 therefore have a frequency of 8 kHz, but their exact position in time is controlled by the clock signals. They are therefore always opposite three consecutive clock pulses. The three consecutive binary message elements "1" or "0" for which the measuring signal is substituted are erased through the agency of and-gate 216, which is closed via a connection from bistable 212. The three extra binary elements 1, 1, 1, however, are output by and-gate 217 connected to output 2121 of bistable 212. The message, with these three extra " 1's," results from the mixing by or-gate 218 of the signals output by and-gates 216, 217. And-gate 219 delivers a pulse in phase with the central pulse of the extra sequence 1, 1, 1 and the latter pulse is applied to the input of and-gate 223 and, via polarity inverter 227, to the input of gate 220. And-gate 220 erases the central pulse of this sequence in the random message. And-gate 223 outputs a signal identical to the signal output by and-gate 219 — i.e., the central pulse of the 1, 1, 1 sequence.

The message with the extra elements 1, 1, 1 and output by or-gate 218 triggers bistable 228 which operates as a divider by two on negative transitions of the binary elements. The two signals output by bistable 228 at 2281 and 2282 are applied to and-gates 221 and 222 respectively which divide the message output by and-gate 220 into two pulse trains of even and odd order respectively.

The same output signals of bistable 228 are applied to and-gates 224, 225 respectively so as to route the central pulse of the 1, 1, 1 sequence to output 2106 or 2107 if the first and third pulse of the latter sequence appear at output 2104 or 2105 and conversely. In other words, the central measuring pulse goes through and-gates 224 and 225 to outputs 2106 or 2107 so that after amplification by amplifiers 25 and 26 (FIG. 1), whose outputs are coupled together by transformer 27, there is no polarity error at the output of facility 30.

Facility 226 is of known kind and is a means of providing a continuous reduction in the duration of the measuring pulse and of delaying such pulse in time. The circuit arrangement of facility 226 is therefore a known circuit arrangement enabling a brief pulse to be produced which can be shifted by manual control between the first pulse and third pulse of the 1, 1, 1 sequence. The controls of facility 226 are graduated in duration and in position and are a means of determining the timing of the test pulses relatively to the message pulses to be restored at all levels and all outputs of the pseudo-ternary signal. Facility 226 may or may not be preceded by inverters 323, 324.

Test pulse positioning is measured as follows :

The measuring pulse is transmitted at the same amplitude as the pseudo ternary message pulses, the attenuator 32 being set to zero (FIG. 1). The duration of the measuring pulse is reduced to produce polarity errors at the output of repeater 3 (FIG. 1), whereafter attempts are made to find that position of the pulse at which the errors cease.

Measuring pulse duration is reduced again to produce errors which it is attempted to eliminate by altering the delay. This procedure is continued until measuring-pulse duration cannot be further reduced without causing the reappearance of polarity errors. Measuring pulse delay can then be read on the corresponding graduation of facility 226.

The delay in a properly operating repeater should be zero — i.e., the brief measuring pulse should be equidistant from the first and third pulses of the 1, 1, 1 sequence.

FIG. 4 shows the wave forms of the signals present at places 2101, 2102, 2103 in FIG. 3 and the wave forms of the signals at outputs 2111, 2121, 2131, 2141 of bistables 211 to 214, at output 2151 of gate 215, at outputs 2161, 2171, 2181 of gates 216, 217, 218, at output 2191 of gate 219, at the two outputs 2281, 2282 of bistable 228, at outputs 2201, 2231 of gates 220, 223, at output 2261 of facility 226 and at output terminals 2104-2107 which are also those of gates 221, 222, 224, 225 and those of the complete installation of FIG. 3.

Of course, logic circuits similar to the logic circuit of FIG. 3 can be devised to produce the signals represented on the third lines of FIGS. **2*b* and 2*c*.**

The use of the means hereinbefore described for the monitoring of coded-signal repeaters is not limited to pseudo-ternary code, and such means are also of use for pseudo-ternary high-density codes and for paired selected ternary codes.

What I claim is:

1. A system for supervising the operation of a repeater for pseudo-ternary coded signals, comprising means for applying a random sequence of message signals transmitted in pseudo-ternary code to the repeater input via an artificial line whose characteristics simulate the characteristics of a real transmission line; means for periodically injecting into such sequence measuring signals having at least one of a number of predetermined compositions; means for adjusting the amplitude relationship of a single pulse chosen in each of the measuring signals to the peak amplitude of all the transmitted signals; and counting means for measuring at the repeater output the number of polarity errors occurring in a predetermined period of time.

2. A system according to claim 1, in which there are used three measuring signal compositions which represent the respective translations into pseudo-ternary code of the binary combinations (1, 1, 1), (0, 1) and (1); and in which the measuring signals are transposed into pseudo-ternary code without polarity error in relation to the immediately preceding random message pseudo-ternary signal in the case of the binary signal (1, 1, 1) and with systematic polarity violation in relation to the immediately preceding random pseudo-ternary signal in the case of the binary signals (0, 1) and (1).

3. A system according to claim 1, in which the random and measuring signals are first produced in binary code, and thereafter translated into pseudo-ternary-code signals.

4. A system according to claim 1, in which there are provided means for producing a random sequence of binary-coded signals are means for converting latter said signals into said pseudo-ternary code message signals.

5. A system according to claim 1, in which said amplitude relationship adjusting means consist of an adjustable attenuator.

* * * * *